(12) United States Patent
Chiu et al.

(10) Patent No.: US 11,698,531 B2
(45) Date of Patent: Jul. 11, 2023

(54) OPTICAL DEVICE COMBINING SPECTACLE FUNCTION WITH AUGMENTED REALITY FUNCTION AND AUGMENTED REALITY DEVICE

(71) Applicant: Acer Incorporated, New Taipei (TW)

(72) Inventors: Yi-Jung Chiu, New Taipei (TW); Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 272 days.

(21) Appl. No.: 17/033,687

(22) Filed: Sep. 26, 2020

(65) Prior Publication Data

US 2021/0333552 A1     Oct. 28, 2021

(30) Foreign Application Priority Data

Apr. 23, 2020  (TW) .................................. 109113660

(51) Int. Cl.
| | | |
|---|---|---|
| *G02B 27/01* | (2006.01) | |
| *G02C 7/02* | (2006.01) | |
| *G02B 27/42* | (2006.01) | |

(52) U.S. Cl.
CPC ..... *G02B 27/0172* (2013.01); *G02B 27/4205* (2013.01); *G02C 7/02* (2013.01); *G02B 2027/0118* (2013.01); *G02B 2027/0174* (2013.01)

(58) Field of Classification Search
CPC ............ G02B 27/0172; G02B 27/4205; G02B 2027/0118; G02B 2027/0174; G02C 7/02
USPC ....................................................... 351/158
See application file for complete search history.

(56) References Cited

U.S. PATENT DOCUMENTS

| | | |
|---|---|---|
| 2014/0240834 A1 | 8/2014 | Mason |
| 2016/0085300 A1 | 3/2016 | Robbins et al. |
| 2017/0153455 A1 | 6/2017 | Takahashi |
| 2019/0056593 A1 | 2/2019 | Bablumyan |
| 2019/0213933 A1 | 7/2019 | Huang et al. |

FOREIGN PATENT DOCUMENTS

| | | |
|---|---|---|
| CN | 206039139 | 3/2017 |
| CN | 109154720 | 1/2019 |
| CN | 106020496 | 4/2019 |
| CN | 110146989 | 8/2019 |
| CN | 209281075 | 8/2019 |
| TW | 201701021 | 1/2017 |
| TW | 201727313 | 8/2017 |
| TW | 201805692 | 2/2018 |
| WO | 2014061920 | 4/2014 |

(Continued)

*Primary Examiner* — Collin X Beatty
*Assistant Examiner* — Grant A Gagnon
(74) *Attorney, Agent, or Firm* — JCIPRNET (57) ABSTRACT

An optical device combining a spectacle function with an augmented reality function adapted to let an ambient light beam enter an eye of a user is provided. The optical device includes a spectacle lens and a diffractive optical element. The spectacle lens has a first surface facing the eye and a second surface facing away from the eye. The diffractive optical element is disposed on the first surface of the spectacle lens or between the first surface and the second surface of the spectacle lens. The diffractive optical element has a third surface facing the eye and a fourth surface facing away from the eye. The diffractive optical element is a diffractive optical film or a diffractive optical plate. An augmented reality device is also provided.

18 Claims, 4 Drawing Sheets

(56) References Cited

FOREIGN PATENT DOCUMENTS

| WO | 2017199232 | 11/2017 |
| WO | 2018224802 | 12/2018 |
| WO | 2019122528 | 6/2019 |
| WO | 2019126331 | 6/2019 |

OPTICAL DEVICE COMBINING SPECTACLE FUNCTION WITH AUGMENTED REALITY FUNCTION AND AUGMENTED REALITY DEVICE

CROSS-REFERENCE TO RELATED APPLICATION

This application claims the priority benefit of Taiwan application serial no. 109113660, filed on Apr. 23, 2020. The entirety of the above-mentioned patent application is hereby incorporated by reference herein and made a part of this specification.

BACKGROUND

Technical Field

The disclosure relates to an optical device and an augmented reality (AR) device, and in particular, to an optical device combining a spectacle function with an augmented reality function and an augmented reality device.

Description of Related Art

Augmented reality technology is a technology that integrates information such as visual effects, sound effects, and spatial information of the virtual world into real environment information. It not only presents the real environment information, but also displays virtual information. The existing augmented reality devices are not provided with a spectacle function. A user with vision correction needs has to additionally wear correction spectacles to see the real environment information more clearly and obtain a better visual experience. In addition, the existing augmented reality devices may be easily affected by external stray light when used outdoors.

The disclosure provides an optical device combining a spectacle function with an augmented reality function and an augmented reality device, which can provide spectacles having augmented reality effect.

An embodiment of the disclosure provides an optical device combining a spectacle function with an augmented reality function, adapted to let an ambient light beam enter an eye of a user. The optical device combining the spectacle function with the augmented reality function includes a spectacle lens and a diffractive optical element (DOE). The spectacle lens has a first surface facing the eye and a second surface facing away from the eye. The diffractive optical element is disposed on the first surface of the spectacle lens or between the first surface and the second surface of the spectacle lens. The diffractive optical element has a third surface facing the eye and a fourth surface facing away from the eye, and the diffractive optical element is a diffractive optical film or a diffractive optical plate.

An embodiment of the disclosure provides an augmented reality device including a spectacle lens, a diffractive optical element, and a projector. The spectacle lens has a first surface facing an eye of a user of the augmented reality device and a second surface facing away from the eye. The diffractive optical element is disposed on the first surface of the spectacle lens or disposed in the spectacle lens. The diffractive optical element has a third surface facing the eye and a fourth surface facing away from the eye, and the diffractive optical element is a diffractive optical film or a diffractive optical plate. The projector outputs an image light beam. The diffractive optical element is disposed on a transmission path of the image light beam, and the diffractive optical element projects the image light beam to the eye. An ambient light beam from an external environment is transmitted to the eye after passing through the spectacle lens and the diffractive optical element.

Based on the above, in the optical device and the augmented reality device of the embodiments of the disclosure, by combining the diffractive optical element with the spectacle lens, spectacles having the augmented reality effect can be provided.

To make the aforementioned more comprehensible, several embodiments accompanied with drawings are described in detail as follows.

DESCRIPTION OF THE EMBODIMENTS

Figure 1:
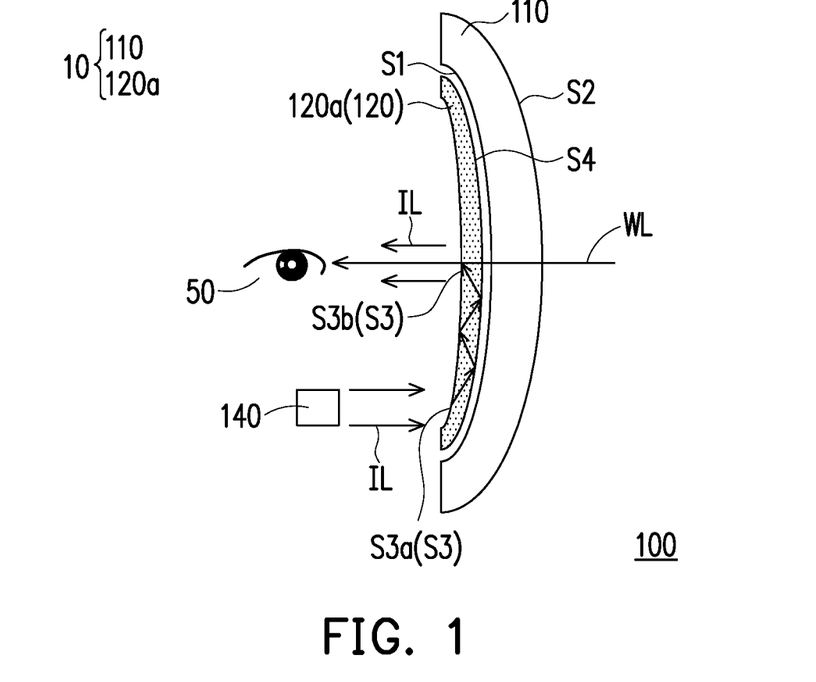
FIG. 1 is a schematic cross-sectional view showing an optical device and an augmented reality device according to an embodiment of the disclosure.

FIG. 1 is a schematic cross-sectional view showing an optical device 10 and an augmented reality device 100 according to an embodiment of the disclosure. Referring to FIG. 1, the optical device 10 combining a spectacle function with an augmented reality function in this embodiment includes a spectacle lens 110 and a diffractive optical element 120. The spectacle lens 110 has a first surface S1 facing an eye 50 and a second surface S2 facing away from the eye 50. The diffractive optical element 120 is disposed on the first surface S1 of the spectacle lens 110 or between the first surface S1 and the second surface S2 of the spectacle lens 110. In other words, in this embodiment, the diffractive optical element 120 may be disposed on one side of the first surface S1 of the spectacle lens 110 (for example, being attached to the first surface S1 of the spectacle lens 110) or may be disposed in the spectacle lens 110. In an embodiment, the diffractive optical element 120 may be in direct contact with the first surface S1 of the spectacle lens 110. For example, the diffractive optical element 120 may be directly fixed on the first surface S1 of the spectacle lens 110 through attachment or another bonding method, or the diffractive optical element 120 may be directly formed on the first surface S1 of the spectacle lens 110. However, in other embodiments, other film layers may be further disposed between the diffractive optical element 120 and the first surface S1 of the spectacle lens 110. The diffractive optical element 120 has a third surface S3 facing the eye 50 and a fourth surface S4 facing away from the eye 50. In this embodiment, the optical device 10 combining the spectacle function with the augmented reality function is adapted to let an ambient light beam WL enter the eye 50 of the user. Therefore, the user can see the real world scene through the optical device 10 combining the spectacle function with the augmented reality function. By combining the diffractive optical element with the spectacle lens, the optical device of the disclosure can provide a spectacle having augmented reality effect.

Further, the spectacle lens 110 of the embodiment of the disclosure may be a lens for correcting myopia, hyperopia, or presbyopia. Moreover, the spectacle lens 110 of the embodiment of the disclosure may have two or more correction functions according to actual requirements. Therefore, the user of the optical device of the disclosure does not need to additionally wear correction spectacles in addition to the optical device, which can reduce the burden on the user and improve the convenience of use. In addition, the spectacle lens 110 may be a plastic lens to improve the safety of the optical device and the augmented reality device of the disclosure. The diffractive optical element 120 of the embodiment of the disclosure has a diffractive structure (not shown in the figure). Specifically, the diffractive optical element 120 may be a diffractive optical film or a diffractive optical plate having a diffractive structure. As an example, the embodiment of FIG. 1 shows that the diffractive optical element 120 is a diffractive optical film 120a. However, in other embodiments, the diffractive optical element 120 may also be a diffractive optical plate. In this embodiment, the diffractive optical film 120a is used. In addition to reducing the production cost, the diffractive optical film 120a can also prevent the eye 50 from injury when the spectacle lens 110 is broken due to collision.

In addition, in this embodiment, the diffractive optical element 120 is configured to cause at least a portion of the light beam entering via the third surface S3 of the diffractive optical element 120 to undergo total reflection between the third surface S3 and the fourth surface S4 of the diffractive optical element 120. In this configuration, a part of the diffractive optical element 120 has a light guiding function similar to a waveguide element.

FIG. 1 also shows an augmented reality device 100 according to an embodiment of the disclosure. Referring to FIG. 1, the augmented reality device 100 of this embodiment includes a spectacle lens 110, a diffractive optical element 120, and a projector 140. The spectacle lens 110 has a first surface S1 facing an eye 50 of a user of the augmented reality device 100 and a second surface S2 facing away from the eye 50. The diffractive optical element 120 is disposed on the first surface S1 of the spectacle lens 110 or between the first surface S1 and the second surface S2 of the spectacle lens 110. The diffractive optical element 120 has a third surface S3 facing the eye 50 and a fourth surface S4 facing away from the eye 50. The spectacle lens 110 and the diffractive optical element 120 may have configurations similar to those of the optical device 10 combining the spectacle function with the augmented reality function as described above, which shall not be repeatedly described herein. In this embodiment, the projector 140 outputs an image light beam IL. The diffractive optical element 120 is disposed on the transmission path of the image light beam IL, and the diffractive optical element 120 projects the image light beam IL to the eye 50. In other words, the image light beam IL output by the projector 140 may be projected to the diffractive optical element 120 and then projected to the eye 50 of the user via the diffractive optical element 120. Therefore, the user can see the projected augmented image through the diffractive optical element 120. In addition, an ambient light beam WL from the external environment may be transmitted to the eye 50 after passing through the spectacle lens 110 and the diffractive optical element 120. Therefore, the user can also see real world objects through the spectacle lens 110 and the diffractive optical element 120 at the same time, and thereby the augmented image and the real world object image can be combined to realize the augmented reality device function.

Further, referring to FIG. 1, in this embodiment, the image light beam IL output by the projector 140 is projected to the third surface S3 of the diffractive optical element 120. At least a portion of the image light beam IL may pass through the third surface S3 via a light entrance part S3a of the third surface S3 and enter the diffractive optical element 120. After passing through the third surface S3, the at least a portion of the image light beam IL may undergo total reflection between the third surface S3 and the fourth surface S4 of the diffractive optical element 120. After undergoing total reflection between the third surface S3 and the fourth surface S4 of the diffractive optical element 120, the at least a portion of the image light beam IL may undergo diffraction at at least one of the third surface S3 and the fourth surface S4 and pass through a light exit part S3b of the third surface S3 to project to the eye 50. Therefore, the at least a portion of the image light beam IL can pass through the third surface S3 to leave the diffractive optical element 120 and project to the eye 50 of the user. Specifically, the part of the diffractive optical element 120 located between the light entrance part S3a and the light exit part S3b has a light guiding function similar to a waveguide element and can transmit the image light beam IL.

Figure 2:
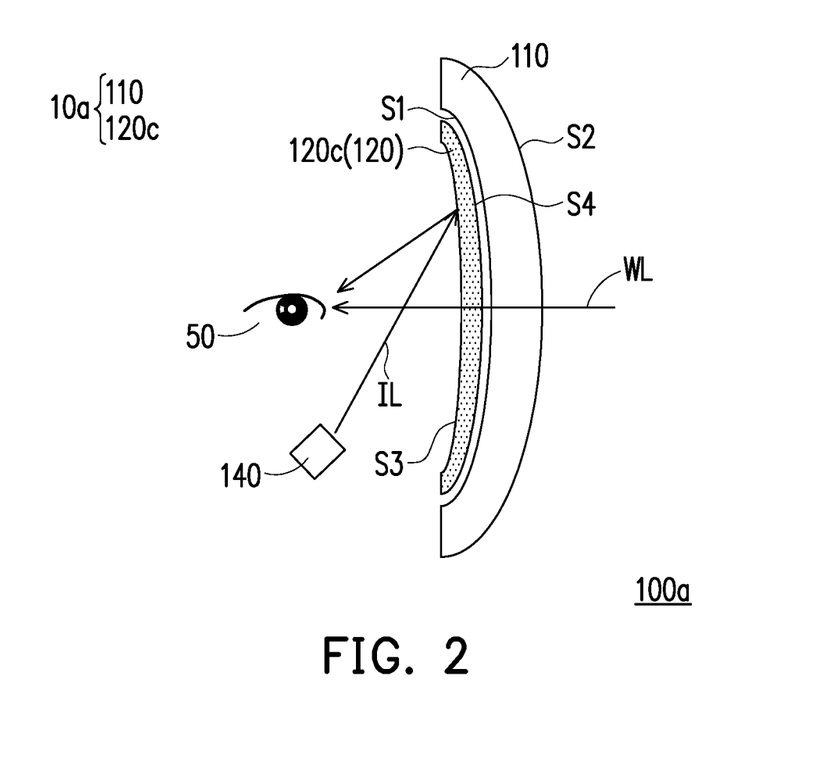
FIG. 2 is a schematic cross-sectional view showing an optical device and an augmented reality device according to another embodiment of the disclosure.

FIG. 2 is a schematic cross-sectional view showing an optical device 10a and an augmented reality device 100a according to another embodiment of the disclosure. Referring to FIG. 2, the optical device 10a and the augmented reality device 100a of this embodiment are similar to the optical device 10 and the augmented reality device 100 of FIG. 1, and the main difference between the two will be described below. In this embodiment, the diffractive optical element 120 is a holographic optical element (HOE) 120c. In other words, the diffractive optical element 120 is configured so that the light beam incident on the third surface S3 of the diffractive optical element 120 undergoes reflective diffraction on the third surface S3. In this embodiment, the image light beam IL is projected to the third surface S3 of the diffractive optical element 120. The image light beam IL undergoes reflective diffraction on the third surface S3 of the diffractive optical element 120 to project at least a portion of the image light beam IL to the eye 50.

Figure 3:
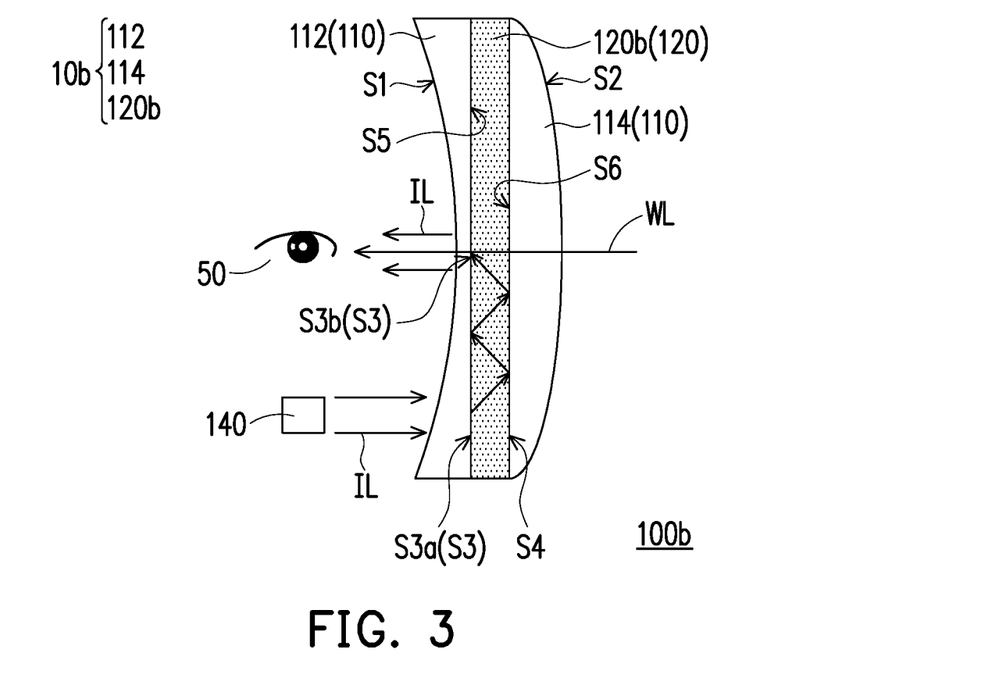
FIG. 3 is a schematic cross-sectional view showing an optical device and an augmented reality device according to another embodiment of the disclosure.

FIG. 3 is a schematic cross-sectional view showing an optical device 10b and an augmented reality device 100b according to another embodiment of the disclosure. Referring to FIG. 3, the optical device 10b and the augmented reality device 100b of this embodiment are similar to the optical device 10 and the augmented reality device 100 of FIG. 1, and the main difference between the two will be described below. In this embodiment, the diffractive optical element 120 is disposed between the first surface S1 and the second surface S2 of the spectacle lens 110. In this embodiment, the spectacle lens 110 may further include a first sub-lens 112 and a second sub-lens 114, and the diffractive optical element 120 is disposed between the first sub-lens 112 and the second sub-lens 114. Specifically, the first sub-lens 112 includes the first surface S1 of the spectacle lens 110 and a fifth surface S5 facing away from the first surface S1, and the second sub-lens 114 includes the second surface S2 of the spectacle lens 110 and a sixth surface S6 facing away from the second surface S2. By attaching the fifth surface S5 of the first sub-lens 112 and the sixth surface S6 of the second sub-lens 114 respectively to the third surface S3 and the fourth surface S4 of the diffractive optical element 120, the diffractive optical element 120 is covered in the spectacle lens 110.

The diffractive optical element 120 of this embodiment is similar to the diffractive optical element 120 shown in FIG. 1 and FIG. 2. The diffractive optical element 120 of this embodiment may have a configuration similar to that of the diffractive optical element 120 of the embodiments of FIG. 1 and FIG. 2 as described above. In this embodiment, the diffractive optical element 120 is a diffractive optical plate 120b. In other embodiments, the diffractive optical element 120 may also be replaced with the diffractive optical film similar to those shown in FIG. 1 and FIG. 2.

In this embodiment, the diffractive optical element 120 may be configured to cause at least a portion of the light beam entering via the third surface S3 of the diffractive optical element 120 to undergo total reflection between the third surface S3 and the fourth surface S4 of the diffractive optical element 120. Referring to FIG. 3 again, in the augmented reality device 100b of this embodiment, the image light beam IL output by the projector 140 passes through the first surface S1 of the spectacle lens 110 and is projected to the third surface S3 of the diffractive optical element 120 (the image light beam IL in the first sub-lens 112 is omitted from the schematic view of FIG. 3). The at least a portion of the image light beam IL may pass through the third surface S3 via the light entrance part S3a of the third surface S3 and enter the diffractive optical element 120. After passing through the third surface S3, the at least a portion of the image light beam IL may undergo total reflection between the third surface S3 and the fourth surface S4 of the diffractive optical element 120. After undergoing total reflection between the third surface S3 and the fourth surface S4 of the diffractive optical element 120, the at least a portion of the image light beam IL may undergo diffraction at at least one of the third surface S3 and the fourth surface S4 and pass through the light exit part S3b of the third surface S3 of the diffractive optical element 120 and the first surface S1 of the spectacle lens 110 to project to the eye 50 (the image light beam IL in the first sub-lens 112 is omitted from the schematic view of FIG. 3). Specifically, the part of the diffractive optical element 120 located between the light entrance part S3a and the light exit part S3b has a light guiding function similar to a waveguide element and can transmit the image light beam IL.

In other embodiments, the diffractive optical element 120 may also be a holographic optical element. When the image light beam IL output from the projector 140 passes through the first surface S1 of the spectacle lens 110 and is projected to the third surface S3 of the diffractive optical element 120, the image light beam IL may undergo reflective diffraction on the third surface S3 of the diffractive optical element 120, so that at least a portion of the image light beam IL passes through the first surface S1 of the spectacle lens 110 to project to the eye 50.

Figure 4:
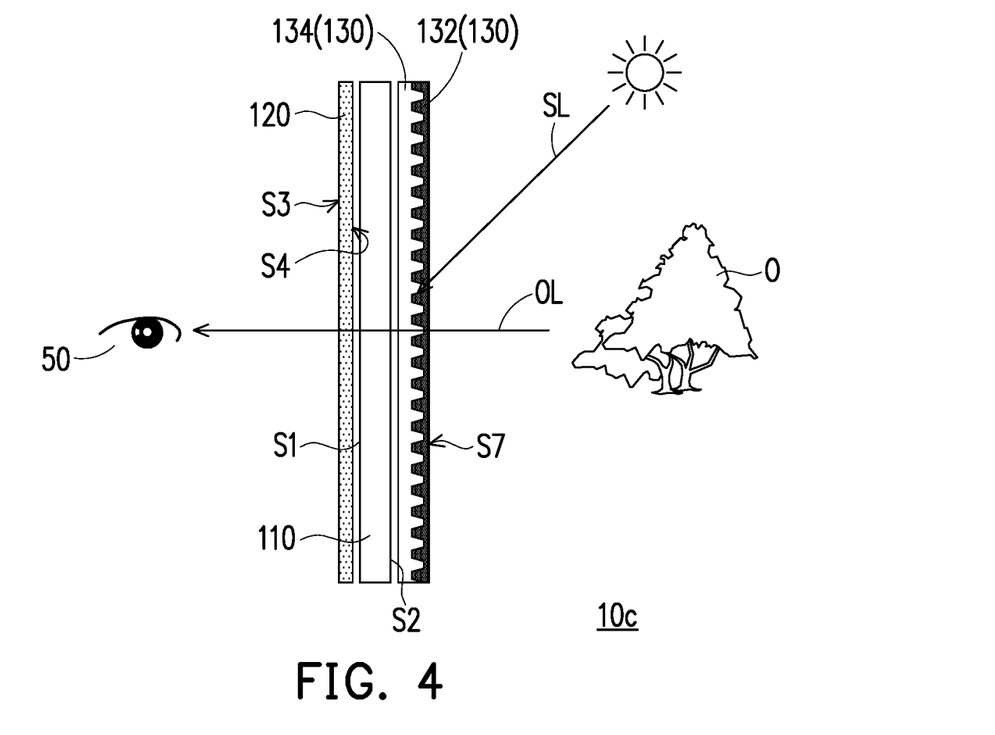
FIG. 4 is a schematic cross-sectional view showing an optical device according to another embodiment of the disclosure.
Figure 5:
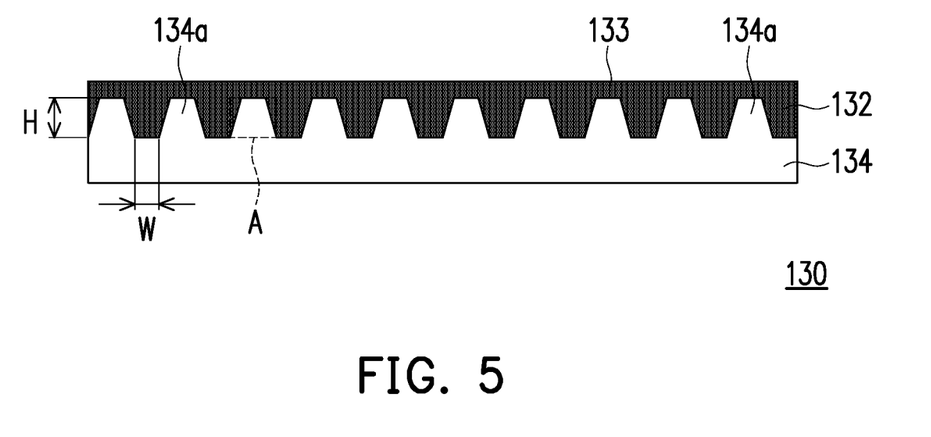
FIG. 5 is a schematic cross-sectional view showing a light-shielding element of the optical device of the embodiment of FIG. 4.

FIG. 4 is a schematic cross-sectional view showing an optical device 10c according to another embodiment of the disclosure. FIG. 5 is a schematic cross-sectional view showing a light-shielding element 130 of the optical device 10c of the embodiment of FIG. 4. Referring to FIG. 4, the optical device 10c of this embodiment is similar to the optical device 10 of FIG. 1, and the main difference between the two will be described below. In this embodiment, the optical device 10c combining the spectacle function with the augmented reality function further includes a light-shielding element 130 disposed on the second surface S2 of the spectacle lens 110. The light-shielding element 130 may be fixed on the second surface S2 of the spectacle lens 110 through attachment, or the light-shielding element 130 may be directly made on the second surface S2 of the spectacle lens 110. The light-shielding element 130 includes a plurality of strip-shaped light-shielding structures 132. As shown in FIG. 4, the plurality of strip-shaped light-shielding structures 132 may absorb or reflect a stray light beam SL (e.g., direct sunlight beam) from the external environment, but a reality light beam OL from an object O (e.g., the light reflected by a tree in the field of view of the user) may enter the eye 50 of the user via a gap between the plurality of strip-shaped light-shielding structures 132. Through the light-shielding element 130, the optical device or the augmented reality device of the disclosure can shield the stray light beam SL, and reduce the stray light entering the eye 50 of the user but allow most of the reality light beam OL to pass through. Therefore, when the optical device or the augmented reality device of the disclosure is used outdoors, it is less likely to be affected by the external stray light.

In some embodiments, the light-shielding element 130 may further include a substrate film 134 disposed between the strip-shaped light-shielding structures 132 and the second surface S2 of the spectacle lens 110. Referring to FIG. 4 and FIG. 5, the light-shielding element 130 of this embodiment is a film including a plurality of strip-shaped light-shielding structures 132. The plurality of strip-shaped light-shielding structures 132 are disposed on the substrate film 134, and the substrate film 134 is attached to the second surface S2 of the spectacle lens 110. In some embodiments, the substrate film 134 may further include a plurality of strip-shaped transparent structures 134a, and the plurality of strip-shaped transparent structures 134a may fit with the plurality of strip-shaped light-shielding structures 132. In other words, the plurality of strip-shaped light-shielding structures 132 may be disposed in the grooves formed by the plurality of strip-shaped transparent structures 134a. For example, the plurality of strip-shaped transparent structures 134a may be formed by ultraviolet curing. After the plurality of strip-shaped transparent structures 134a are formed, the plurality of strip-shaped light-shielding structures 132 may be formed by filling a light-absorbing material in the grooves between adjacent strip-shaped transparent structures 134a. As shown in FIG. 5, the light-shielding element 130 of this embodiment may include a connection part 133 formed of a light-absorbing material between adjacent strip-shaped light-shielding structures 132. The connection part 133 has a smaller thickness compared to the strip-shaped light-shielding structure 132, so the connection part 133 does not have much influence on the penetration of light. In other embodiments, the plurality of strip-shaped light-shielding structures 132 may also be directly disposed on the surface of the spectacle lens 110. For example, grooves may be formed on the second surface S2 of the spectacle lens 110 and a light-absorbing material may be filled therein to form the plurality of strip-shaped light-shielding structures 132. The term "transparency" as used herein refers to allowing light to pass through. In the embodiment of the disclosure, the light transmittance of the strip-shaped transparent structure 134a is higher than that of the strip-shaped light-shielding structure 132.

In some embodiments, according to the requirements of use, other film layers (not shown) may be further disposed between the light-shielding element 130 and the second surface S2 of the spectacle lens 110, or other film layers (not shown) may be disposed on a seventh surface S7, which faces away from the second surface S2, of the light-shielding element 130. In this embodiment, each strip-shaped light-shielding structure 132 is arranged along a substantially horizontal direction to shield the stray light from above and maintain a wide field of view in the horizontal direction while shielding the stray light.

In addition, in this embodiment, the plurality of strip-shaped light-shielding structures 132 may be made of a black light-shielding material such as a black dye. In some embodiments, the strip-shaped light-shielding structure 132 may also be made of a photochromic material (e.g., a material containing silver chloride or another halogen), which turns into a light-shielding material when the ambient light is strong. However, the disclosure is not limited thereto.

Further, in this embodiment, the plurality of strip-shaped transparent structures 134a satisfy the following condition: H/W≥1, where H is the depth of the strip-shaped transparent structure 134a, and W is the interval at the bottom of the strip-shaped transparent structures 134a. Under this condition, the strip-shaped light-shielding structure 132 may have a greater depth H and exhibit better effect of shielding the stray light. In addition, the strip-shaped transparent structure 134a of this embodiment has a trapezoidal cross section A. In the cross section shown in FIG. 5, the cross section A of the strip-shaped transparent structure 134a is in a trapezoidal shape. As will be described below, configuring the cross section A of the strip-shaped transparent structure 134a as a trapezoidal shape is favorable for the production of the substrate film 134.

Figure 6:
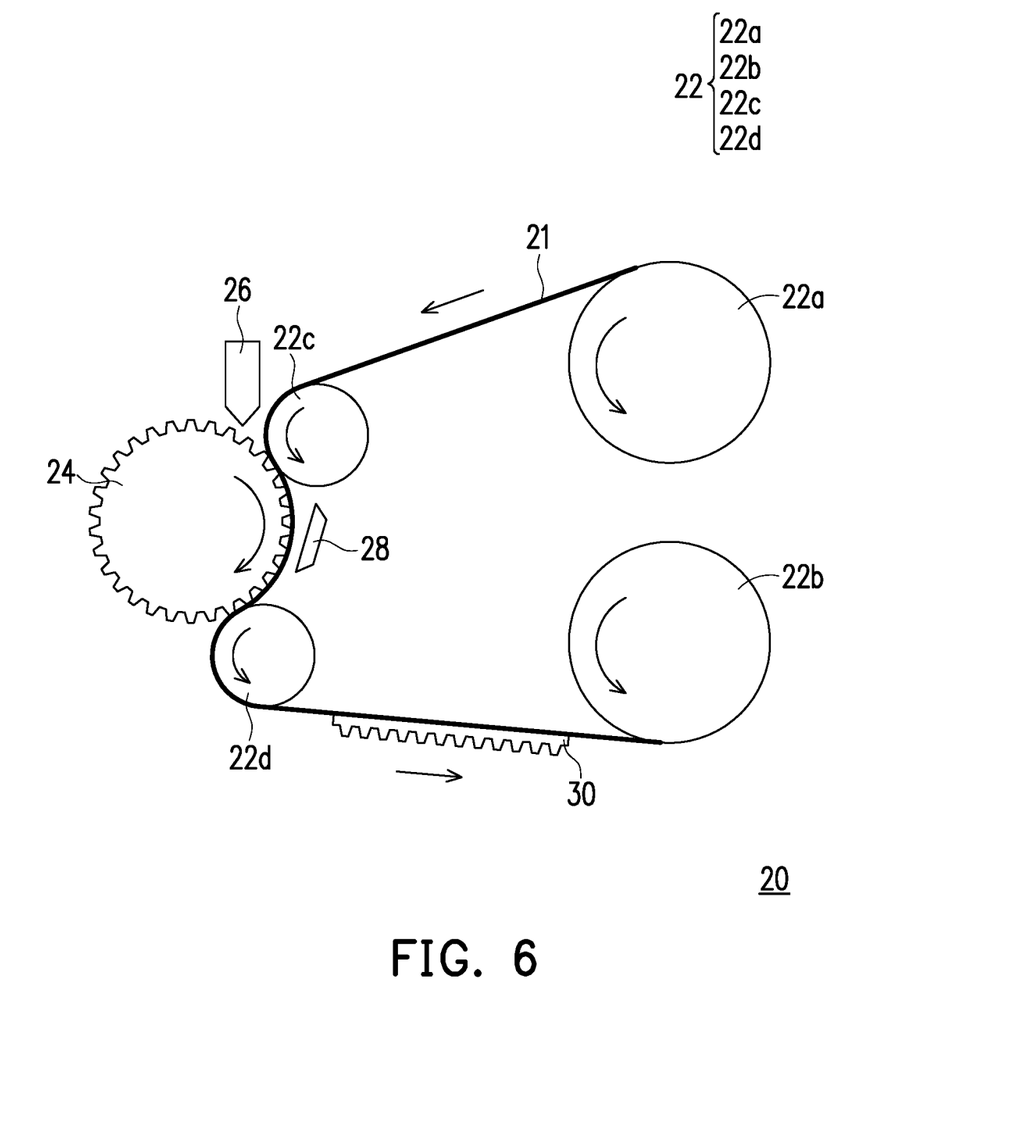
FIG. 6 is a schematic view showing a manufacturing apparatus for manufacturing the light-shielding element according to an embodiment of the disclosure.

FIG. 6 is a schematic view showing a manufacturing apparatus 20 for manufacturing the light-shielding element 130 according to an embodiment of the disclosure. In this embodiment, the manufacturing apparatus 20 includes a roller set 22, a mold roller 24, a gel injection device 26, and a lighting device 28. The roller set 22 may include a first roller 22a, a second roller 22b, a first auxiliary roller 22c, and a second auxiliary roller 22d. In this embodiment, a film material 21 is fixed on the first roller 22a and the second roller 22b, and the film material 21 may be any material. In this embodiment, the film material 21 is a light-transmissive material film layer. The mold roller 24 may have a plurality of tooth molds. In this embodiment, the tooth mold has a trapezoidal cross section for forming a strip-shaped structure having a trapezoidal cross section, but the disclosure is not limited thereto. Configuring the tooth mold to have a trapezoidal cross section is favorable for the subsequent demolding process.

When the manufacturing apparatus 20 of this embodiment is used to manufacture the substrate film 134 or the light-shielding element 130, the first roller 22a expands the film material 21 and conveys it toward the mold roller 24. The first auxiliary roller 22c interposes the film material 21 between the first auxiliary roller 22c and the mold roller 24, and the second auxiliary roller 22d interposes the film material 21 between the second auxiliary roller 22d and the mold roller 24. The gel injection device 26 injects the gel material between the film material 21 and the mold roller 24. The lighting device 28 may be disposed on a side of the film material 21 away from the mold roller 24. When the film material 21 passes by the lighting device 28, the lighting device 28 may emit a light beam to cure the gel material injected between the film material 21 and the mold roller 24 and form on the film material 21 a strip-shaped structure 30 corresponding to the shape of the tooth mold. In this embodiment, the gel material may be, for example, an ultraviolet light curing material, and the lighting device 28 may be, for example, an ultraviolet lamp, but the disclosure is not limited thereto. After the strip-shaped structure 30 is cured and formed, the second roller 22b rolls back the completed strip-shaped structure 30 together with the film material 21. FIG. 6 shows the completed strip-shaped structures 30, and the strip-shaped structures 30 may be used as the plurality of strip-shaped transparent structures 134a of the substrate film 134. In some embodiments, a light-absorbing material may be filled in the plurality of grooves between the strip-shaped structures 30 in advance before rolling back the strip-shaped structures 30, and the disclosure is not limited thereto.

In summary of the above, in the optical device and the augmented reality device of the embodiment of the disclosure, by combining the diffractive optical element with the spectacle lens, spectacles having the augmented reality effect can be provided. In addition, in some embodiments, the optical device and the augmented reality device of the disclosure may be provided with the light-shielding element to shield the stray light and enhance the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical device combining a spectacle function with an augmented reality function, adapted to let an ambient light beam enter an eye of a user, the optical device comprising:
    a spectacle lens having a first surface facing the eye and a second surface facing away from the eye;
    a diffractive optical element disposed on the first surface of the spectacle lens or between the first surface and the second surface of the spectacle lens, wherein the diffractive optical element has a third surface facing the eye and a fourth surface facing away from the eye, and the diffractive optical element is a diffractive optical film or a diffractive optical plate; and
    a light-shielding element disposed on the second surface of the spectacle lens, wherein the light-shielding element comprises a plurality of strip-shaped light-shielding structures.

2. The optical device combining the spectacle function with the augmented reality function according to claim 1, wherein the spectacle lens comprises a first sub-lens and a second sub-lens, and the diffractive optical element is disposed between the first sub-lens and the second sub-lens.

3. The optical device combining the spectacle function with the augmented reality function according to claim 1, wherein the diffractive optical element is configured to cause at least a portion of a light beam entering via the third surface of the diffractive optical element to undergo total reflection between the third surface and the fourth surface of the diffractive optical element.

4. The optical device combining the spectacle function with the augmented reality function according to claim 1, wherein the diffractive optical element is a holographic optical element.

5. The optical device combining the spectacle function with the augmented reality function according to claim 1, wherein each of the plurality of strip-shaped light-shielding structure is arranged along a substantially horizontal direction.

6. The optical device combining the spectacle function with the augmented reality function according to claim 1, wherein the light-shielding element further comprises a substrate film, the substrate film is disposed between the strip-shaped light-shielding structures and the second surface of the spectacle lens, the substrate film comprises a plurality of strip-shaped transparent structures, the strip-shaped transparent structures fit with the strip-shaped light-shielding structures, and the strip-shaped transparent structures have a trapezoidal cross section.

7. The optical device combining the spectacle function with the augmented reality function according to claim 6, wherein the strip-shaped transparent structures satisfy: H/W≥1, where H is a depth of the strip-shaped transparent structures, and W is an interval at a bottom of the strip-shaped transparent structures.

8. The optical device combining the spectacle function with the augmented reality function according to claim 1, wherein the plurality of strip-shaped light-shielding structures comprise black light-shielding material or photochromic material.

9. The optical device combining the spectacle function with the augmented reality function according to claim 1, wherein the spectacle lens is a lens for correcting myopia, hyperopia, or presbyopia.

10. An augmented reality device comprising:
a spectacle lens having a first surface facing an eye of a user of the augmented reality device and a second surface facing away from the eye;
a diffractive optical element disposed on the first surface of the spectacle lens or between the first surface and the second surface of the spectacle lens, wherein the diffractive optical element has a third surface facing the eye and a fourth surface facing away from the eye, and the diffractive optical element is a diffractive optical film or a diffractive optical plate;
a projector outputting an image light beam, wherein the diffractive optical element is disposed on a transmission path of the image light beam, and the diffractive optical element projects the image light beam to the eye; and
a light-shielding element disposed on the second surface of the spectacle lens, wherein the light-shielding element comprises a plurality of strip-shaped light-shielding structures,
wherein an ambient light beam from an external environment is transmitted to the eye after passing through the spectacle lens and the diffractive optical element.

11. The augmented reality device according to claim 10, wherein the image light beam is projected to the third surface of the diffractive optical element, wherein after passing through the third surface, at least a portion of the image light beam undergoes total reflection between the third surface and the fourth surface of the diffractive optical element, wherein after undergoing total reflection between the third surface and the fourth surface of the diffractive optical element, the at least a portion of the image light beam undergoes diffraction at at least one of the third surface and the fourth surface and passes through the third surface to project to the eye.

12. The augmented reality device according to claim 10, wherein the image light beam is projected to the third surface of the diffractive optical element, and the image light beam undergoes reflective diffraction on the third surface of the diffractive optical element to project at least a portion of the image light beam to the eye.

13. The augmented reality device according to claim 10, wherein the spectacle lens comprises a first sub-lens and a second sub-lens, and the diffractive optical element is disposed between the first sub-lens and the second sub-lens.

14. The augmented reality device according to claim 10, wherein each of the plurality of strip-shaped light-shielding structure is arranged along a substantially horizontal direction.

15. The augmented reality device according to claim 10, wherein the light-shielding element further comprises a substrate film, the substrate film is disposed between the strip-shaped light-shielding structures and the second surface of the spectacle lens, the substrate film comprises a plurality of strip-shaped transparent structures, the strip-shaped transparent structures fit with the strip-shaped light-shielding structures, and the strip-shaped transparent structures have a trapezoidal cross section.

16. The augmented reality device according to claim 15, wherein the strip-shaped transparent structures satisfy: H/W≥1, where H is a depth of the strip-shaped transparent structures, and W is an interval at a bottom of the strip-shaped transparent structures.

17. The augmented reality device according to claim 10, wherein the plurality of strip-shaped light-shielding structures comprise black light-shielding material or photochromic material.

18. The augmented reality device according to claim 10, wherein the spectacle lens is a lens for correcting myopia, hyperopia, or presbyopia.

* * * * *